United States Patent [19]

Treharne

[11] Patent Number: 5,100,630
[45] Date of Patent: Mar. 31, 1992

[54] WATER POWERED MAGNETO GENERATOR FOR THE PRODUCTION OF NITROGEN AND PHOSPHORUS FERTILIZER APPARATUS

[76] Inventor: Ronald J. Treharne, 221 Orlando Blvd., Indialantic, Fla. 32904

[21] Appl. No.: 516,062

[22] Filed: Apr. 26, 1990

[51] Int. Cl.[5] .............................................. B01J 19/08
[52] U.S. Cl. ........................ 422/186.24; 422/186.21; 204/179
[58] Field of Search ............ 422/186.24, 186.23, 422/186.21, 904; 204/178, 179; 423/405

[56] References Cited

U.S. PATENT DOCUMENTS

| | | | |
|---|---|---|---|
| 2,069,226 | 2/1937 | Curtis | 71/44 |
| 2,415,822 | 2/1947 | Holmen | 75/10.33 |
| 4,010,897 | 3/1977 | Treharne et al. | 239/8 |
| 4,515,615 | 5/1985 | Eastin | 71/54 |
| 4,681,072 | 7/1987 | Pouring | 123/193 |
| 4,915,915 | 4/1990 | Treharne | 422/186.24 |

Primary Examiner—Brooks H. Hunt
Assistant Examiner—Daniel J. Jenkins

[57] ABSTRACT

A system for producing nitrogen and phosphorus fertilizer using an electric arc discharge through air and phosphate rock in which the electric arc necessary for the process is generated by a magneto-electric generator powered by water pressure. The nitrogen and phosphorus oxides produced by the arc discharge are drawn into the water to serve as a source of nitrogen and phosphorus fertilizer. The net result of the invention is that the operator can provide nitrogen and phosphorus fertilizer as he supplies water. The only inputs to this system are air, phosphate rock, and a source of water under pressure.

3 Claims, 1 Drawing Sheet

WATER POWERED MAGNETO GENERATOR FOR THE PRODUCTION OF NITROGEN AND PHOSPHORUS FERTILIZER APPARATUS

BACKGROUND OF DISCLOSURE

It is known that:
1) $NO_x$ can be produced in high voltage electric arc discharge processes (see above referenced patents), and
2) $P_2O_5$ can be produced from phosphate rock in high temperature electric furnaces (see Thorpes Dictionary of Applied Chemistry, Fourth Edition, Volume IX, page 489).

In the system outlined below, it is shown that the above two processes can be integrated effectively into one process to produce a N/P fertilizer product.

INTRODUCTION

This water-powered magneto system for the production of nitrogen and phosphorus fertilizer is an improvement in design and efficiency of the original "Nitrogen Fertilizer Production System" U.S. Pat. No. 4,010,897 and U.S. Pat. No. 4,915,915. Each system manufactures nitrogen fertilizer by using an electric arc to split the nitrogen ($N_2$) and oxygen ($O_2$) molecules in the air thus allowing $N_2$ and $O_2$ to recombine into nitrogen oxides (NO, $NO_x$) and by bubbling the gases through water to produce nitric acid. This acid when combined with any basic material produces a fixed nitrogen fertilizer.

INVENTION PRINCIPLES

This invention improves the basic designs of prior inventions in three ways. First, the source for electric energy of the high energy electric arc is produced by a magneto generator powered by water pressure, thus no external source of electric power is needed. Second, the additional fertilizer element Phosphorus (P) is created by using the electric arc and the high temperature ionized gas from the chamber to burn of phosphorus oxide ($P_2O_5$) from phosphate rock. Third, in order to improve the efficiency of the nitrogen and phosphorus oxide formation, the air intake is pre-heated by means of an insulating air jacket and the gases are allowed sufficient time to recombine and cool in a residence chamber which is cooled by using the lower temperature of the water through a cooling water jacket.

The final product is a dissolved nitrogen and phosphorus fertilizer generated from only water power, water, air and phosphate rock.

DETAILED DESCRIPTION

Figure 1:
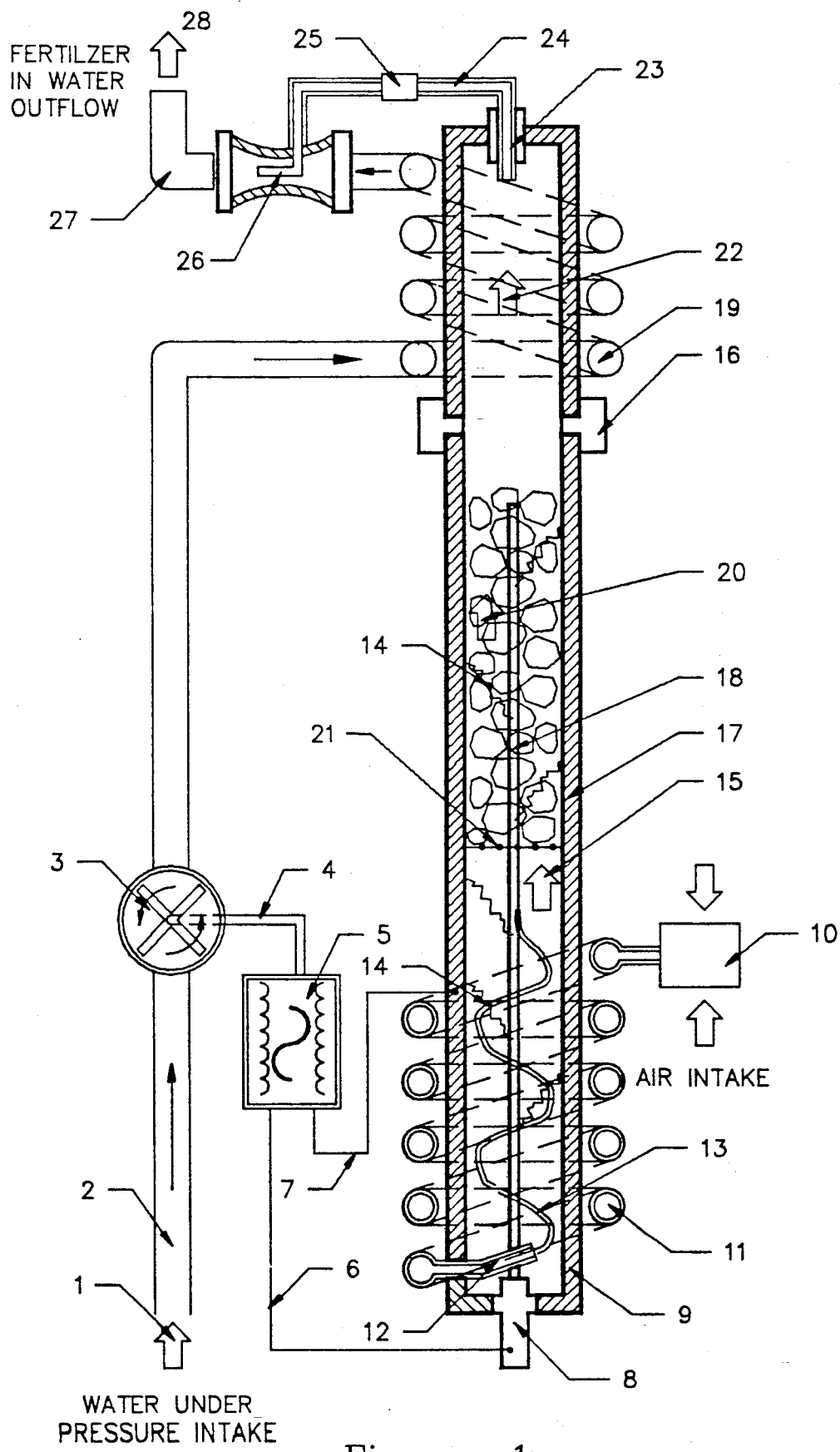
FIG. 1 shows a sectional view of the Water Powered Magneto system for the Production of Nitrogen and Phosphorus Fertilizer.

Water under pressure (1), suitable for irrigation, is piped (2) through any type of mechanical device (3) which can convert linear fluid motion of water flow into a rotary motion (4). This rotary motion (4) then turns a magneto generator (5) which by design generates a relatively high voltage (1000 V-6000 V) and comparatively low amperage electrical current through wires (6 and 7). This electrical current is discharged in a metal chamber (9 and 17) from a centrally located electrode (8) causing high voltage arcing (14). The effect of this arc is to split the nitrogen and oxygen molecules in the air, similar to the process of lightning, whereby some of the nitrogen and oxygen molecules in the air recombine with each other to form nitrogen oxides (NO and $NO_x$).

In order to improve the efficiency of the nitrogen oxide formation, air entering through an air filter (10) is pre-heated by the excess heat generatedfrom the high energy arcing via an insulating air jacket (11) coiled around the hot chamber (9). The higher the temperature of the gases during arcing, the higher the efficiency of the splitting of the nitrogen and air molecules. In addition, in order to improve the nitrogen and oxygen air molecules splitting, the air tube inlet (12) is inserted into the base of the chamber at a tangential and slightly elevated angle so that the escaping air will flow outward and upwards in a spiral shape (13), thus increasing the air flow time and contact with the electric arc and arc chamber (9 and 14).

The hot ionized gases of nitrogen and oxygen (15) exhausted from the arc chamber (9) then pass over rock phosphate (18) which is contained in chamber (17) held in place by a high temperature tolerant support (21). The result of this ionized gas passing over the rock phosphate and the arcing (14) through the phosphate rock is that it will liberate the phosphorus oxide ($P_2O_5$), which sublimes at 300° C., which like the nitrous and nitric oxides when bubbled through water will produce phosphoric acid, both acids can serve as fertilizer nutrients. As the rock phosphate is consumed more rock may be added by way of the coupling device (16).

To aid in the nitrogen and oxygen recombination into nitrous and nitric oxide (NO and $NO_x$) a cooling period is provided by the introduction of a residence chamber (22) which is cooled by the water flow through a water jacket (19) coiled around the cooling chamber (22) which is thermally insulated by the coupling (16). The larger the size of the cooling chamber and thus the longer the cooling period and the more dramatic the temperature drop of the gases from their ionized state, the more efficient the production of the nitrous, nitric and phosphorus oxides.

The phosphorus oxide gas and the nitrous and nitric oxide gases escape from the cooling chamber (22) through a sealed port (23) through a tube (24) and through a check valve (25). The gases are then either bubbled through a container of standing water to produce progressively concentrated solution of nitric and phosphoric acid or are drawn through the flowing water as shown (26) by a Venturi action, similar to the device described in the referenced patents. The final product flows out through the distribution system (27) in the form of phosphoric and nitric acid or as a fixed phosphorus and fixed nitrogen fertilizer (28) ready to be applied directly or combined with some suitable base material as desired to form a dissolved salt ready for irrigation and fertilization.

While this invention has been described in terms of certain preferred embodiments, one skilled in the art will readily appreciate that various modifications, changes, omissions and substitutions may be made without departing from the spirit thereof. It is intended therefore that the present invention be limited by the scope of the following claims:

I claim:

1. An apparatus for the production of nitrogen and phosphorus fertilizer comprising:

a water powered high voltage magneto generator for supplying voltage to a cylindrical chamber containing an inner rod electrode, a cylindrical chamber with an inner wall which acts as an outer electrode for a portion of the axial length of said chamber, an inner rod electrode at one end of said chamber concentrically positioned within said chamber and creating an annular space where an electrical arc between said inner rod electrode and said portion of said chamber is discharged whereby said arc is of sufficient energy to ionize a portion of air to nitrogen oxides, a means for containing phosphate rock within a portion of said chamber adjacent to the portion of said chamber containing said inner electrode, a means for excluding said rock from a portion of said chamber adjacent to the portion of said chamber containing said rock, a means for introducing air into the annular space which allows the air to first pass through the annular space between said inner rod electrode and then through the portion of said chamber containing said phosphate rock, and then through the portion of said chamber which excludes said rock, a means for removing the air from said portion of the chamber which excludes the phosphate rock, a means for bringing water in contact with said chamber for the purpose of cooling said chamber, a means for introducing and pre-heating the air that passes through said chamber into water.

2. The apparatus of claim 1 wherein said generator operates approximately between 1000 V and 6000 V.

3. The apparatus of claim 1 wherein the air that has passed through said chamber is introduced into the water that has been used in cooling said chamber.

* * * * *